US012584757B2

(12) United States Patent
Bond et al.

(10) Patent No.: US 12,584,757 B2
(45) Date of Patent: Mar. 24, 2026

(54) WEARABLE SYSTEM AND METHOD FOR NAVIGATION

(71) Applicant: GM Global Technology Operations LLC, Detroit, MI (US)

(72) Inventors: Jacob Alan Bond, Rochester Hills, MI (US); David William Heyne, Hazel Park, MI (US); Pallavi Gautam, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 50 days.

(21) Appl. No.: 18/679,704

(22) Filed: May 31, 2024

(65) Prior Publication Data

US 2025/0369766 A1     Dec. 4, 2025

(51) Int. Cl.
    *G01C 21/36*          (2006.01)

(52) U.S. Cl.
    CPC ....... *G01C 21/362* (2013.01); *G01C 21/3602* (2013.01); *G01C 21/3629* (2013.01); *G01C 21/3647* (2013.01); *G01C 21/3652* (2013.01)

(58) Field of Classification Search
    CPC .............. G01C 21/362; G01C 21/3602; G01C 21/3629; G01C 21/3647; G01C 21/3652
    USPC ........................................................ 701/433
    See application file for complete search history.

(56) References Cited

U.S. PATENT DOCUMENTS 11,626,001 B1      4/2023  Khmelev et al.
2009/0096746 A1*   4/2009  Kruse ..................... G06F 3/016
                                                   340/407.1

2015/0094949 A1*   4/2015   Kato ................... G01C 21/3688
                                                    701/410
2018/0038703 A1*   2/2018   Verma ................ G01C 21/3469
2021/0089126 A1    3/2021   Nickerson
2021/0287459 A1*   9/2021   Cella ..................... G07C 5/0808
2021/0321413 A1*  10/2021   Shin ...................... H04W 72/23
2022/0083142 A1*   3/2022   Brown .................... G06F 3/016
2023/0029105 A1*   1/2023   Gomez ................. G01S 7/4813
2023/0367833 A1*  11/2023   Kol ....................... G06F 16/958
2024/0103172 A1*   3/2024   Kurfirst .................. G06F 3/016
2024/0103626 A1*   3/2024   Chen .................. G06F 3/03547
2024/0112599 A1*   4/2024   Moskowitz ........... B64U 10/13
2024/0184361 A1*   6/2024   O'Callaghan ........ H04R 1/1041

(Continued)

FOREIGN PATENT DOCUMENTS

DE      102019122842 A1     2/2020
WO        2023151351 A1     8/2023

*Primary Examiner* — Kambiz Abdi
(74) *Attorney, Agent, or Firm* — Vivacqua Crane, PLLC

(57)                ABSTRACT

A method for user movement guidance includes receiving a destination request through a mobile device. The method also includes receiving, by the mobile device, sensor data from a wearable device. The wearable device includes a lanyard and an electronic pendant attached to the lanyard. The electronic pendant includes a camera and a LIDAR sensor. The method also includes establishing communication between the mobile device and a remote system in response to receiving the destination request. The method also includes transmitting, by the mobile device, the sensor data to the remote system in response to establishing the communication between the mobile device and the remote system. The method also includes receiving, by the mobile device, navigation instructions to the destination from the remote system.

16 Claims, 4 Drawing Sheets

(56)                     References Cited

U.S. PATENT DOCUMENTS

2024/0203585 A1 *    6/2024   Hermunen ............ G16H 40/67
2025/0271897 A1 *    8/2025   von Badinski ....... G06F 1/1635

* cited by examiner

WEARABLE SYSTEM AND METHOD FOR NAVIGATION

INTRODUCTION

The present disclosure relates to a wearable devices and, more particularly, to wearable systems and methods for navigation.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Sometimes, it is challenging for visually impaired individuals to navigate along pedestrian walkways without some external navigational guidance. Some navigation technologies rely on displays to show the appropriate path to reach an intended destination. It is therefore desirable to develop a system and method for navigation that does not rely on visual displays.

SUMMARY

The present disclosure describes a method for user movement guidance. The method includes receiving a destination request through a mobile device. The destination request includes a destination. The mobile device includes a device controller. The device controller includes a processor and a non-transitory computer-readable medium in communication with the processor. The method also includes receiving, by the mobile device, sensor data from a wearable device. The wearable device includes a lanyard and an electronic pendant attached to the lanyard. The electronic pendant includes a camera and/or a LIDAR sensor or another suitable distance sensor. Each of the camera and LIDAR sensor are configured to generate the sensor data. The sensor data includes image data collected by the camera. The sensor data includes LIDAR data collected by the LIDAR sensor. The method also includes establishing communication between the mobile device and a remote system in response to receiving the destination request. The method also includes transmitting, by the mobile device, the sensor data to the remote system in response to establishing the communication between the mobile device and the remote system. The method also includes receiving, by the mobile device, navigation instructions to the destination from the remote system. The method described in this paragraph improves mobility technology by allowing a visually impaired user to receive navigation instructions through at least one wearable device without the need for displays.

The present disclosure also describes a system for user movement guidance. The system includes a first wearable device including a lanyard and an electronic pendant attached to the lanyard. The electronic pendant includes a camera and a LIDAR sensor. Each of the camera and the LIDAR sensor is configured to generate sensor data. The sensor data includes image data collected by the camera. The sensor data includes LIDAR data collected by the LIDAR sensor. The system further includes a second wearable device. The second wearable device is a first ring. The system includes a third wearable device. The third wearable device is a second ring. Each of the first ring and the second ring are sized to tightly fit around a human finger. Each of the first ring and the second ring is configured to provide a haptic feedback. The system further includes a mobile device including a device controller. The device controller includes a processor and a non-transitory computer-readable medium in communication with the processor. The device controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
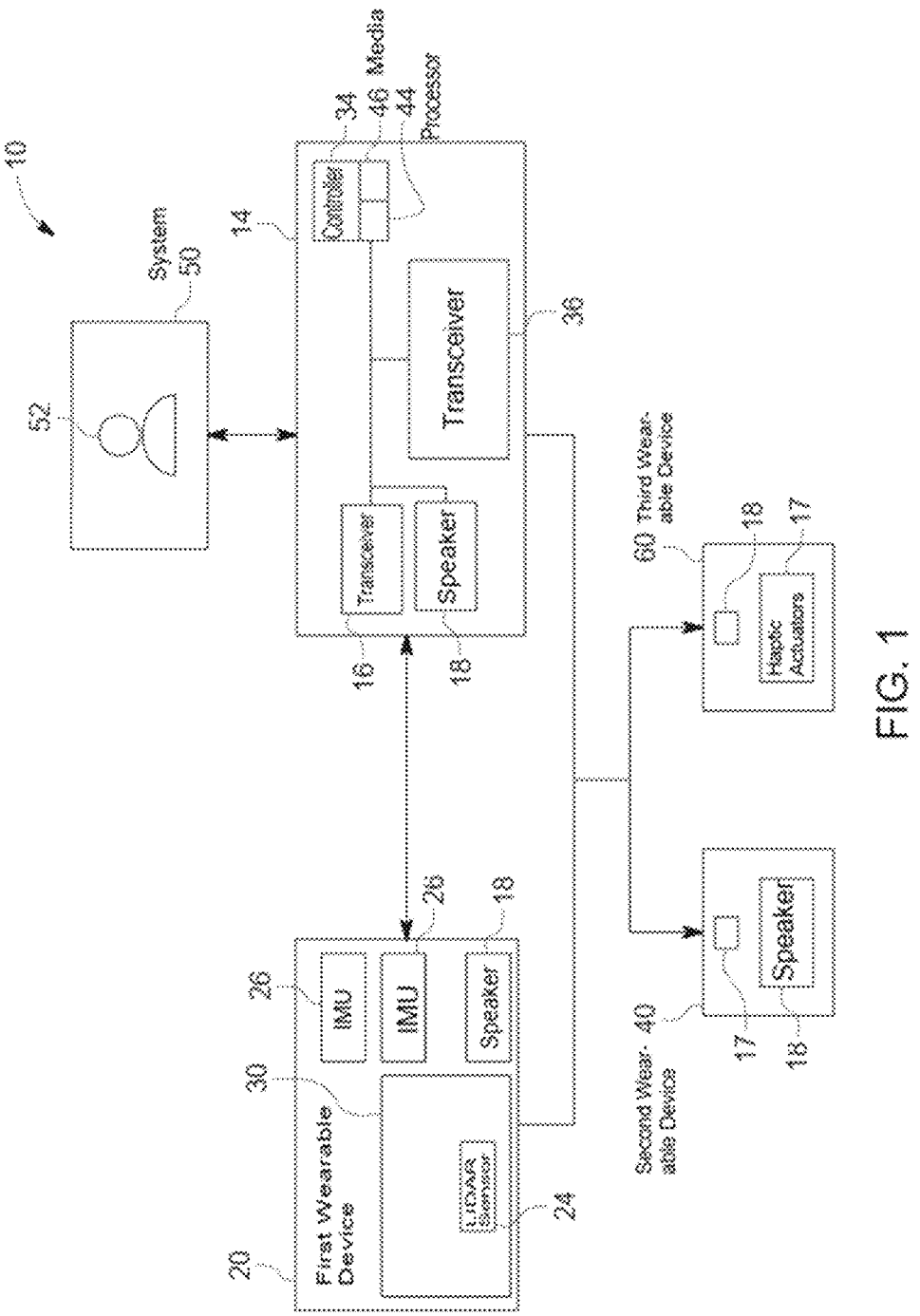
FIG. 1 is a schematic diagram of a system for user movement guidance.

Reference will now be made in detail to several examples of the disclosure that are illustrated in accompanying drawings. Whenever possible, the same or similar reference numerals are used in the drawings and the description to refer to the same or like parts or steps.

Figure 2:
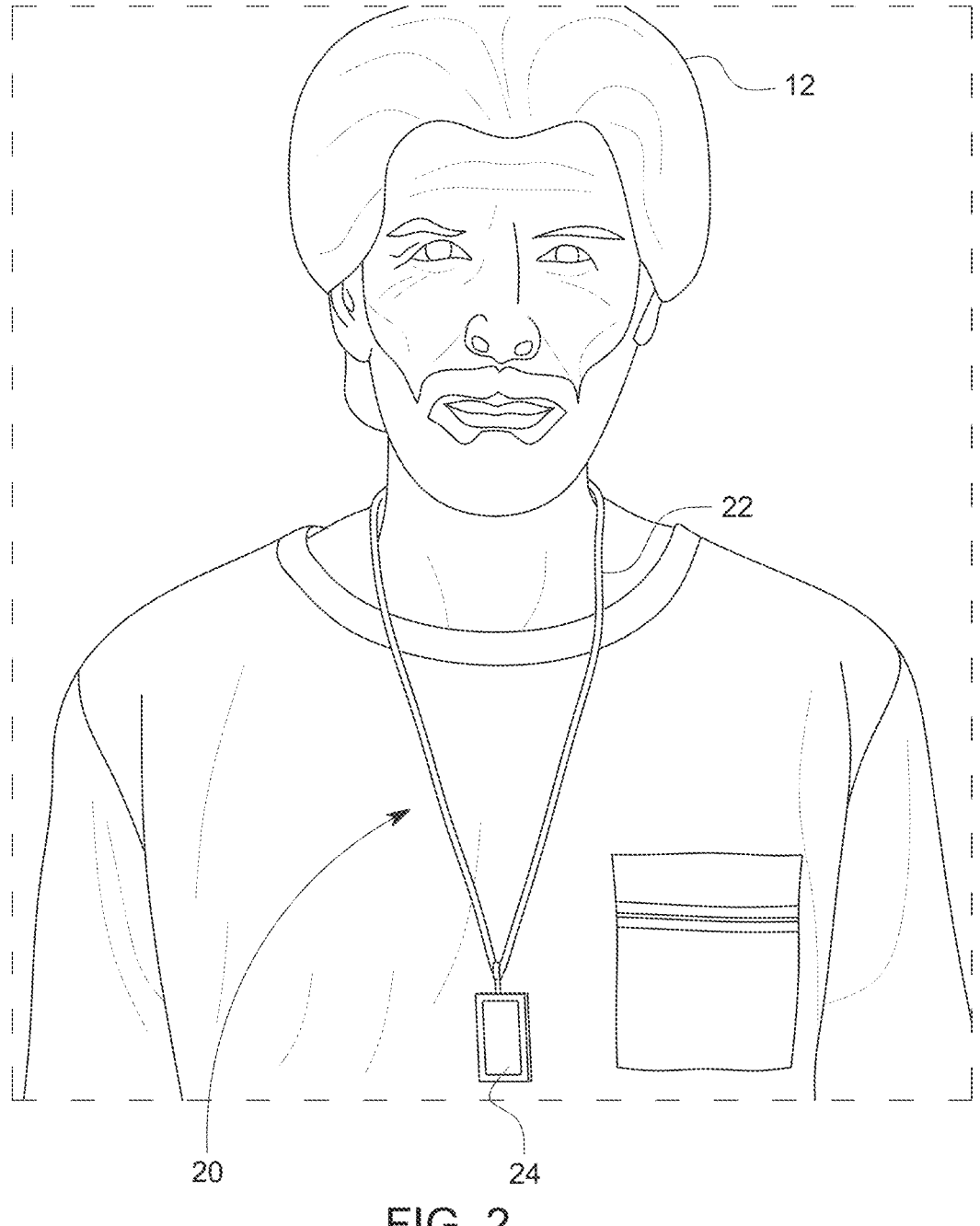
FIG. 2 is a front view of a user wearing a first wearable device of the system of FIG. 1.
Figure 3:
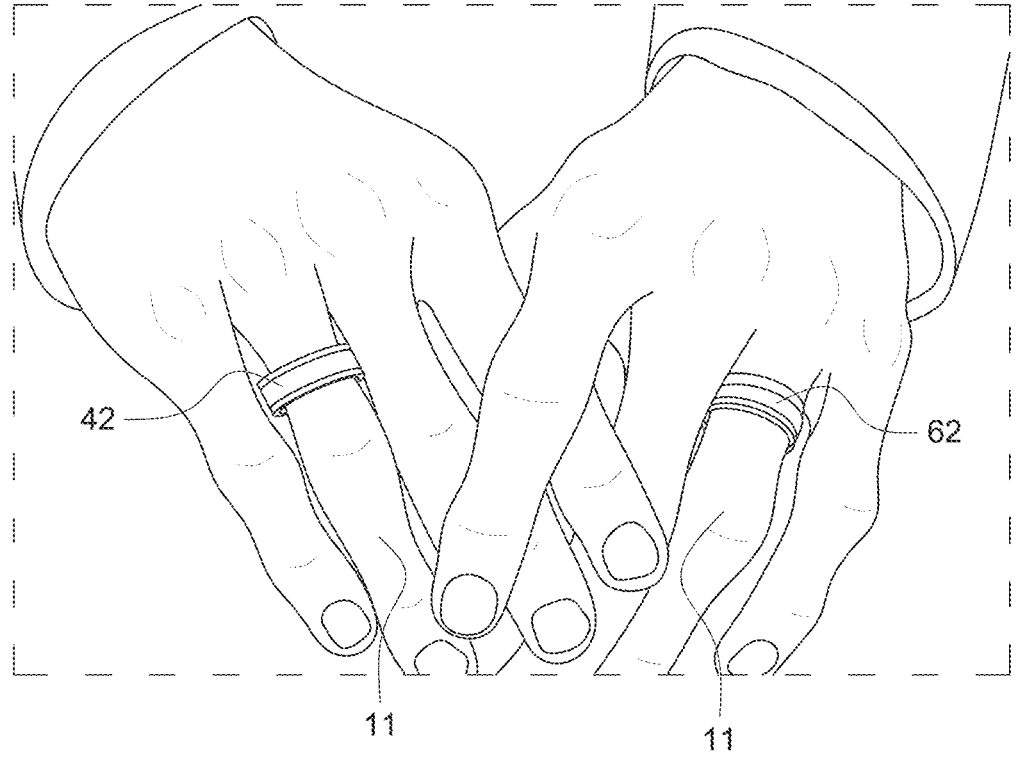
FIG. 3 is a front view of a user wearing a second wearable device and a third wearable device of the system of FIG. 1.

With reference to FIGS. 1-3, a system 10 can be used for user navigation of visually impaired users 12. The system includes a mobile device 14 (or another computing device). In the present disclosure, the term "mobile device" means a piece of portable electronic equipment that can connect to the internet, especially a smartphone or tablet computer. The mobile device 14 includes a device controller 34 includes at least one processor 44 and at least one non-transitory computer readable storage device or media 46. The processor 44 may be a custom-made processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or nonvolatile memory that may be used to store various operating variables while the processor 44 is powered down. The computer-readable storage device or media of the controller 34 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions. As mentioned above, the mobile device 14 may be substituted or supplemented by any other computing device including the at least one processor 44 and at least one non-transitory computer readable storage device or media 46. As discussed above, the system 10 may include another computing device instead of (or in addition to) the mobile device 14. The computing device includes one or more device controllers 34, which in turn includes device controller 34 includes at least one processor 44 and at least one non-transitory computer readable storage device or media 46. The computing device may be, for example, an in-vehicle interface.

The mobile device 14 further includes one or more vehicle transceivers 36 in communication with the device controller 34. Each of the vehicle transceivers 36 is config-ured to wirelessly communicate information to and from other entities using, for example, one or more wireless communication technologies. As non-limiting examples, the wireless communication technologies include near-field communication (NFC), Ultra-wideband (UWB), BLU-ETOOTH, and Wi-Fi, and a cellular network. As non-limiting examples, the transceivers 36 may transmit and/or receive information one or more remote systems 50 at a remote call center (e.g., ON-STAR by GENERAL MOTORS) and/or personal electronic devices, such as a mobile phone. The remote system 50 may be operated by an operator 52 (i.e., a human) called an off-board advisor. In certain embodiments, the transceivers 36 may be configured to communicate via a wireless local area network (WLAN) using IEEE 802.11 standards or by using cellular data communication. However, additional or alternate commu-nication methods are also considered within the scope of the present disclosure.

The mobile device 14 includes one or more Global Navigation Satellite System (GNSS) transceivers 16 and/or receivers (e.g., Global Positioning System transceivers and/or receivers) in communication with the device controller 34. The GNSS transceivers 16 receive location data from the GNSS (e.g., GPS). Further, the mobile device 14 includes one or more speakers 18 configured to generate audible sound, such as navigation commands. The speaker 18 is in communication with the device controller 34. Accordingly, the device controller 34 may command the speaker 18 to generate audible sound.

The system 10 further includes a first wearable device 20 in wireless or wired communication with the mobile device 14 (or other computing device). The first wearable includes a lanyard 22 and an electronic pendant 24 attached to the lanyard 22. Instead of using a lanyard 22, the electronic pendant could be attached magnetically or with a pin to a piece of clothing. The visually impaired user 12 may wear the first wearable device 20 around his neck. The electronic pendant 22 includes one or more cameras 26, one or more LIDAR sensors 24 (or another distance sensor such as ultrasonic sensors, computing distance from a stereographic camera pair, etc.), inertial measurement unit (IMU) 26 and possibly other type of sensors. These sensors (e.g., cameras 26, LIDAR sensors 24, and IMUs 26) generate sensor data and wirelessly transmit the sensor data to the device con-troller 34. The sensor data at least includes image data collected by the camera 26 and LIDAR data collected by the LIDAR sensor 24. The first wearable device 20 also includes one or more speakers 18 to generate audible sounds and one or more gimbal stabilizer 30 to maintain the electronic pendant 24 in an upright position, thereby maximizing the quality of the sensor readings.

The system 10 further includes a second wearable device 40 and a third wearable device 60 each in wireless commu-nication with the mobile device 14. The second wearable device 40 is a first ring 42, and the third wearable device 60 is a second ring 62. Each of the first ring 42 and the second ring 42 is sized to be placed around a human finger 11. For instance, the first ring 42 may be worn in a left-hand finger 11, and the second ring 62 may be worn in the right-hand finger 11 to facilitate providing directional instructions to a destination. Each of the first wearable device 40 and the second wearable device 60 includes one or more speakers to output audible sounds, such as navigation instructions. Each of the first wearable device 40 and the second wearable device 60 includes one or more haptic actuators 17 (e.g., eccentric rotating mass actuators) to generate the haptic feedback. The haptic feedback produced by the first wear-able device 40 and the second wearable device 60 are indicative of directional instructions. For example, a haptic feedback generated by the first ring 42 is indicative of a right turn, whereas a haptic feedback generated by the second ring 62 is indicative of a left turn. Each of the first wearable device 20, the second wearable device 40, and the third wearable device 60 may have one or more computing device including at least one processors 44 and at least one non-transitory computer readable storage device or media 46.

Figure 4:
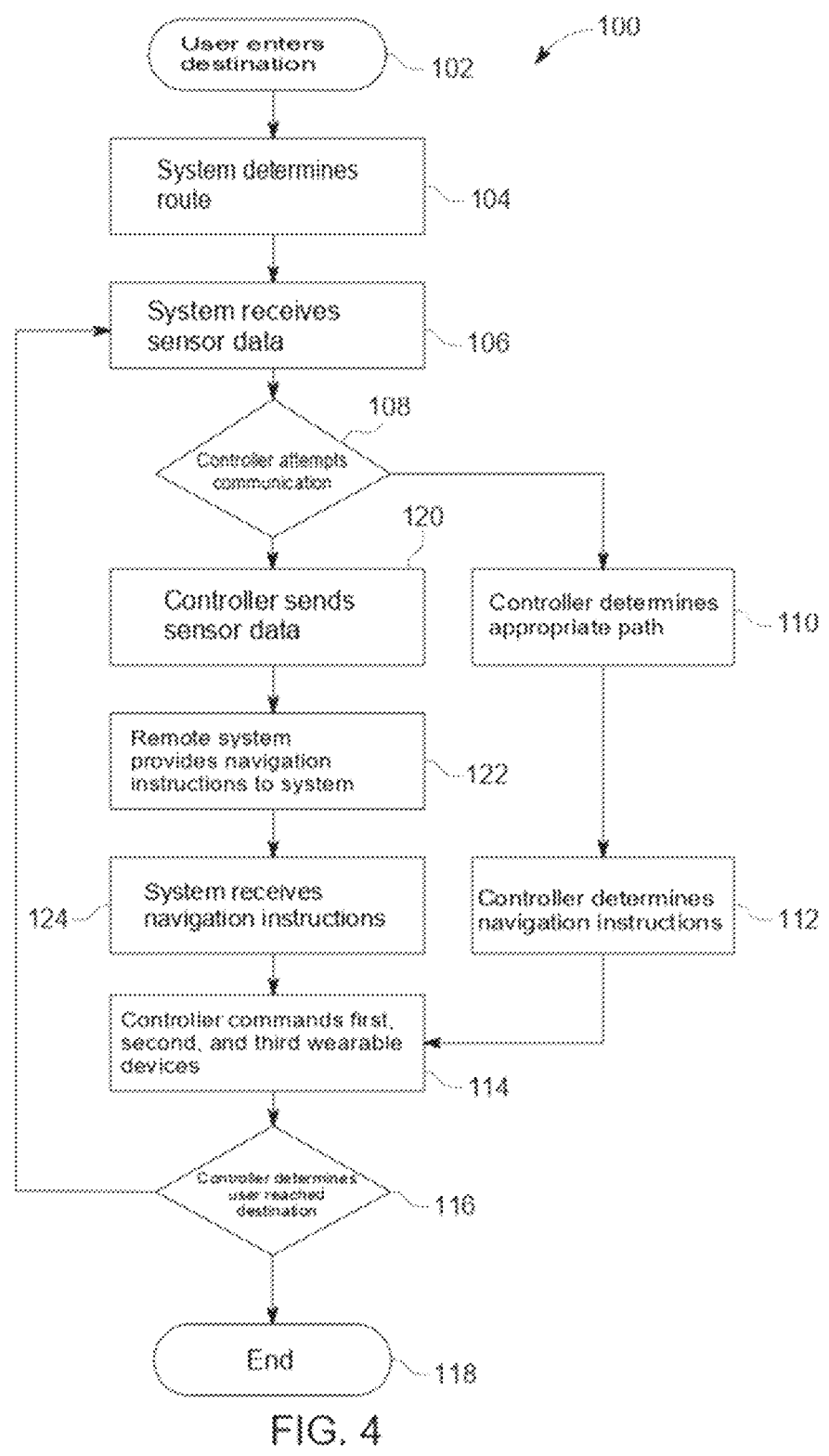
FIG. 4 is a method for user movement guidance using the system of FIG. 1.

FIG. 4 is a method 100 for user movement guidance or navigation. The device controller 34 is programmed to execute the method 100. The method 100 begins at block 102. At block 102, the visually impaired user 12 enters a destination or inputs a destination request through the mobile device 14, the first wearable device 20, the second wearable device 40, and/or the third wearable device 60. The destination request includes a destination. The system 11 (e.g., the device controller 34) then determines the route to reach the destination. Then, the method 100 continues to block 106. At block 106, the system 11 (e.g., the device controller 34) receives the sensor data from the first wear-able device 20. As discussed above, the sensor data may include, among other things, image data collected by the camera 26 and LIDAR data collected by the LIDAR sensor 24. Then, the method 100 continues to block 108.

At block 108, the device controller 34 attempts to estab-lish a wireless communication with the remote system 50. If no communication is established between the remote system 50 and the mobile device 14, then the method 100 proceeds to block 110. At block 110, the device controller 34 deter-mines the appropriate path to follow the previously deter-mined route to the destination. Then, the method 100 con-tinues to block 112. At block 112, the device controller 34 determines the navigation instructions to reach the destina-tion. These navigation instructions may be pedestrian instruction (e.g., walking instructions) to teach the destina-tion. Next, the method 100 proceeds to block 114.

At block 114, the device controller 34 commands the first wearable device 20, the second wearable device 40, the third wearable device 60, and/or the speaker 18 of the mobile device 14 to output the navigation instructions to reach the destination. The navigation instructions to reach the desti-nation may be provided as audible sound through the speakers 18 of the first wearable device 20, the second wearable device 40, the third wearable device 60. Alterna-tively, or additionally, haptic feedback may be provided through the second wearable device 40 and/or third wearable device 60 as part of the navigation instructions. The navi-gation instructions may also be provided through the elec-tronic pendant 24 of the first wearable device 20. Then, the method 100 continues to block 116.

At block 116, the device controller 34 determines whether the visually impaired user 12 has reached his destination. If the visually impaired user 12 has not reached his destination, then the method 100 returns to block 106. If the visually impaired user 12 has reached his destination, then the method 100 continues to block 118. At block 118, the method 100 ends.

Returning to block 108, if wireless communication is established between the remote system 50 and the mobile device 14, then the method 100 proceeds to block 120. At block 120, the device controller 34 sends the sensor data to the remote system 50. Then, the method 100 continues to block 122. The remote system 50 through, for example operator 52, provides instructions for navigation along the route. The navigation instructions are verbally provided by the operator 52 of the remote system 50 and communicated to the virtually impaired user 12. Then, the method 100 continues to block 122. The system 11 (e.g., device controller 34) receives the navigation instructions. Then, the method 100 continues to block 114.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for visually impaired user movement guidance, comprising:
   receiving a destination request through a computing device, wherein the destination request includes a destination, the computing device includes a device controller, the device controller includes a processor and a non-transitory computer-readable medium in communication with the processor;
   receiving, by the computing device, sensor data from a wearable device, wherein the wearable device includes an electronic pendant, the electronic pendant includes at least one of a camera or a distance sensor;
   in response to receiving the destination request, establishing communication between the computing device and a remote system being remote from the visually impaired user;
   in response to establishing the communication between the computing device and the remote system, transmitting, by the computing device, the sensor data to the remote system; and
   receiving, by the computing device, navigation instructions to the destination from the remote system,
   wherein the computing device is a mobile device, the distance sensor is a LIDAR sensor, the sensor data includes LIDAR data collected by the LIDAR sensor,
   wherein a human operator being remote from the visually impaired user provides verbal navigation instructions to the visually impaired user for navigating along a route, the navigation instructions being outputted through a speaker of a first wearable device, the human operator being of the remote system.

2. The method of claim 1, wherein the wearable device is the first wearable device, and the method further includes outputting the navigation instructions through a second wearable device and a third wearable device, the electronic pendant includes the camera, and the sensor data includes image data collected by the camera.

3. The method of claim 2, wherein the second wearable device is a first ring, and the third wearable device is a second ring.

4. The method of claim 3, wherein each of the first ring and the second ring are configured to generate haptic feedback indicative of the navigation instructions.

5. The method of claim 4, wherein each of the first ring and the second ring includes an eccentric rotating mass actuator to generate the haptic feedback.

6. The method of claim 5, wherein the electronic pendant of the first wearable device is configured to output the navigation instructions.

7. The method of claim 6, further comprising:
   determining that the communication between the mobile device and the remote system was not established; and
   in response to determining that the communication between the mobile device and the remote system was not established, determining, by the mobile device, the navigation instructions to reach the destination.

8. The method of claim 7, wherein the electronic pendant of the first wearable device includes a speaker, and the method further comprises outputting the navigation instructions through a speaker of the first wearable device.

9. A system for visually impaired user movement guidance, comprising:

a wearable device including a lanyard and an electronic pendant attached to the lanyard, wherein the electronic pendant includes a camera and a LIDAR sensor, each of the camera and the LIDAR sensor is configured to generate sensor data, the sensor data includes image data collected by the camera, and the sensor data includes LIDAR data collected by the LIDAR sensor;

a mobile device including a device controller, wherein the device controller includes a processor and a non-transitory computer-readable medium in communication with the processor, wherein the device controller is programmed to:

receive a destination request, wherein the destination request includes a destination;

receive the sensor data from the wearable device;

in response to receiving the destination request, establish communication between the mobile device and a remote system being remote from the visually impaired user;

in response to establishing the communication between the mobile device and the remote system, transmit the sensor data to the remote system; and receive navigation instructions to reach the destination from the remote system, wherein a human operator being remote from the visually impaired user provides verbal navigation instructions to the visually impaired user for navigating along a route, the navigation instructions being outputted through a speaker of a first wearable device, the human operator being of the remote system.

10. The system of claim 9, wherein the wearable device is the first wearable device, the system further includes a second wearable device and a third wearable device, and the device controller is programmed to command the second wearable device and the third wearable device to output the navigation instructions.

11. The system of claim 10, wherein the second wearable device is a first ring, and the third wearable device is a second ring, and each of the first ring and the second ring is sized to be placed around a human finger.

12. The system of claim 11, wherein the electronic pendant of the first wearable device includes a speaker configured to output the navigation instructions.

13. The system of claim 12, wherein each of the first ring and the second ring are configured to generate haptic feedback indicative of the navigation instructions.

14. The system of claim 13, wherein the device controller of the mobile device is programmed to:

determine that the communication between the mobile device and the remote system was not established; and in response to determining that the communication between the mobile device and the remote system was not established, determine the navigation instructions to reach the destination.

15. A system for visually impaired user movement guidance, comprising:

a first wearable device including a lanyard and an electronic pendant attached to the lanyard, wherein the electronic pendant includes a camera and a LIDAR sensor, each of the camera and the LIDAR sensor is configured to generate sensor data the sensor data includes image data collected by the camera, and the sensor data includes LIDAR data collected by the LIDAR sensor;

a second wearable device, wherein the second wearable device is a first ring;

a third wearable device, wherein the third wearable device is a second ring, wherein each of the first ring and the second ring are sized to tightly fit around a human finger, and each of the first ring and the second ring is configured to provide a haptic feedback;

a mobile device including a device controller, wherein the device controller includes a processor and a non-transitory computer-readable medium in communication with the processor, wherein the device controller is programmed to:

receive a destination request, wherein the destination request includes a destination;

receive the sensor data from the first wearable device;

in response to receiving the destination request, establish communication between the mobile device and a remote system being remote from the visually impaired user;

in response to establishing the communication between the mobile device and the remote system, transmit the sensor data to the remote system; and receive navigation instructions to reach the destination from the remote system; and command the first ring, the second ring, and the electronic pendant to provide the navigation instructions to reach the destination, wherein a human operator being remote from the visually impaired user provides verbal navigation instructions to the visually impaired user for navigating along a route, the navigation instructions being outputted through a speaker of the first wearable device, the human operator being of the remote system.

16. The system of claim 15, wherein the device controller of the mobile device is programmed to:

determine that the communication between the mobile device and the remote system was not established; and in response to determining that the communication between the mobile device and the remote system was not established, determine the navigation instructions to reach the destination.

\* \* \* \* \*